United States Patent [19]

Gibson et al.

[11] Patent Number: 4,968,548
[45] Date of Patent: Nov. 6, 1990

[54] REMOVABLE FLOOR COVER FOR RECREATIONAL VEHICLES

[76] Inventors: William E. Gibson; Sigrid Gibson, both of Rte. 5, Box 310, Livingston, Tex. 77351

[21] Appl. No.: 367,795

[22] Filed: Jun. 19, 1989

[51] Int. Cl.$^5$ .............................. B32B 3/06; B60J 9/00
[52] U.S. Cl. ........................................ 428/95; 15/215; 296/97.23; 428/100
[58] Field of Search ................ 15/215; 296/97.23; 428/85, 95, 100

[56] References Cited

U.S. PATENT DOCUMENTS

| | | | |
|---|---|---|---|
| 2,898,146 | 8/1959 | Yudenfreund | 296/39.1 |
| 3,129,972 | 4/1964 | Vodra | 296/97.23 |
| 3,401,975 | 9/1968 | Oger | 296/97.23 |
| 3,669,817 | 6/1972 | McDevitt | 428/83 X |
| 4,481,240 | 11/1984 | Roth | 428/100 X |
| 4,575,146 | 3/1986 | Markos | 52/716 X |
| 4,671,981 | 6/1987 | McLaughlin | 428/100 X |
| 4,748,063 | 5/1988 | Reuben | 428/100 X |
| 4,789,574 | 12/1988 | Selvey | 428/100 X |
| 4,804,567 | 2/1989 | Reuben | 428/100 X |
| 4,829,627 | 5/1989 | Altus et al. | 428/85 X |
| 4,856,654 | 8/1989 | Reuben | 428/100 X |

Primary Examiner—Henry F. Epstein
Attorney, Agent, or Firm—Neal J. Mosely

[57] ABSTRACT

A removable floor cover formed of one or more sections of a durable fabric is installed over the existing floor or carpeted areas of a recreational vehicle to protect the existing floor or carpet from dirt and wear. A plurality of strips of a fabric type hook and loop fastener are secured onto the underside of the floor cover in spaced relation positioned inwardly from and parallel to the peripheral edges of the cover and the peripheral edges outward of the fasteners are folded upward to reside against one or more walls of the area being covered. In carpeted areas, the fastener hook elements are releasably engaged with the fibers of the existing carpet when the cover is pressed thereon to maintain the cover on the carpeted area. In un-carpeted areas, a plurality of strips of the mating loop element of the fastener are secured onto the floor surface inwardly and closely adjacent to at least one wall of the floor area covered and positioned to correspond with the strips of the hook elements at the peripheral edges of said floor cover whereby the hook elements are releasably engaged with the loop elements to maintain said cover on the floor surface. The cover may be made in several overlapping sections with additional strips of the fastener elements secured on the underside of the cover and/or the floor at selected locations to maintain the cover on the floor or carpeted areas.

15 Claims, 1 Drawing Sheet

REMOVABLE FLOOR COVER FOR RECREATIONAL VEHICLES

BACKGROUND OF THE INVENTION

1. FIELD OF THE INVENTION

This invention relates generally to removable floor coverings to be installed over the existing floor or carpet of a recreational vehicle to protect from dirt and wear.

2. BRIEF DESCRIPTION OF THE PRIOR ART

Because the occupants are often living or visiting outdoor areas, the floors and carpet of recreational vehicles, such as motor-homes and campers are subjected to more damage than typical floor and carpet installations caused by tracking in mud, dirt, debris, and other materials and the exposure to moisture, etc. Cleaning the floor and carpet is also a major problem due to the remote location. As a result, the flooring or carpet needs to be refinished or replaced often.

It would therefore be advantageous and desirable to provide a removable and replaceable floor or carpet cover which could be quickly and easily installed in the recreational vehicle during periods of detrimental use and removed for easy cleaning. Such a device would extend the useful life and attractiveness of the existing floor or carpet.

Protective covers for the floor of vehicles are known in the art. There are several patents which disclose various vehicle floor mats and automotive floor coverings.

Yundenfreund, U.S. Pat. No. 2,898,146 discloses a foldable insert and liner for the rear of station wagons.

McDevitt, U.S. Pat. No. 3,669,817 discloses a reversible carpet flooring for the rear of station wagons.

Roth, U.S. Pat. No. 4,481,240 and disclose a rug or mat for automobiles which is held in place by fasteners attached to the underside of the mat which have stiff bristles that engage the floor carpet.

McLaughlin, U.S. Pat. No. 4,671,981 discloses an automobile carpet having a removable section which is held in place by zippers, Velcro type fasteners, or magnets.

Reuben, U.S. Pat. 4,748,063 discloses a rug or mat for automobiles which is held in place by interlocking projections.

Vodra, U.S. Pat. No. 3,129,972 discloses a one-piece flexible automobile floor mat having a raised peripheral dam and a plurality of ridges to retain water and other materials.

Oger, U.S. Pat. No. 3,401,975 discloses an automobile floor mat constructed in three parts to fit the floor in front of the front seat to retain water and other materials in the side parts.

The present invention is distinguished over the prior art in general, and these patents in particular by a removable floor cover formed of one or more sections of a durable fabric installed over the existing floor or carpeted areas of a recreational vehicle to protect the existing floor or carpet from dirt and wear. A plurality of strips of a fabric type hook and loop fastener are secured onto the underside of the floor cover in spaced relation positioned inwardly from and parallel to the peripheral edges of the cover and the peripheral edges outward of the fasteners are folded upward to reside against one or more walls of the area being covered. In carpeted areas, the fastener hook elements are releasably engaged with the fibers of the existing carpet when the cover is pressed thereon to maintain the cover on the carpeted area. In un-carpeted areas, a plurality of strips of the mating loop element of the fastener are secured onto the floor surface inwardly and closely adjacent to at least one wall of the floor area covered and positioned to correspond with the strips of the hook elements at the peripheral edges of said floor cover whereby the hook elements are releasably engaged with the loop elements to maintain said cover on the floor surface. The cover may be made in several overlapping sections with additional strips of the fastener elements secured on the underside of the cover and/or the floor at selected locations to maintain the cover on the floor or carpeted areas.

SUMMARY OF THE INVENTION

It is therefore an object of the present invention to provide a removable floor cover for recreational vehicles which is installed over the existing floor or carpet to prevent damage to the underlying floor or carpet.

It is another object of this invention to provide a removable floor cover for recreational vehicles which is easily and quickly installed over the existing floor or carpet and removed therefrom.

Another object of this invention is to provide a removable floor cover for recreational vehicles which is made of durable washable fabric material which is easily cleaned or washed.

A still further object of this invention is to provide a removable floor cover for recreational vehicles which is attractive and simple in design and construction, economical to manufacture, and rugged and durable in use.

Other objects of the invention will become apparent from time to time throughout the specification and claims as hereinafter related.

The above noted objects and other objects of the invention are accomplished by a removable floor cover formed of one or more sections of a durable fabric is installed over the existing floor or carpeted areas of a recreational vehicle to protect the existing floor or carpet from dirt and wear. A plurality of strips of a fabric type hook and loop fastener are secured onto the underside of the floor cover in spaced relation positioned inwardly from and parallel to the peripheral edges of the cover and the peripheral edges outward of the fasteners are folded upward to reside against one or more walls of the area being covered. In carpeted areas, the fastener hook elements are releasably engaged with the fibers of the existing carpet when the cover is pressed thereon to maintain the cover on the carpeted area. In un-carpeted areas, a plurality of strips of the mating loop element of the fastener are secured onto the floor surface inwardly and closely adjacent to at least one wall of the floor area covered and positioned to correspond with the strips of the hook elements at the peripheral edges of said floor cover whereby the hook elements are releasably engaged with the loop elements to maintain said cover on the floor surface. The cover may be made in several overlapping sections with additional strips of the fastener elements secured on the underside of the cover and/or the floor at selected locations to maintain the cover on the floor or carpeted areas. The cover is quickly installed and easily removed to be shaken out, cleaned, or washed.

DESCRIPTION OF THE PREFERRED EMBODIMENT

Figure 1:
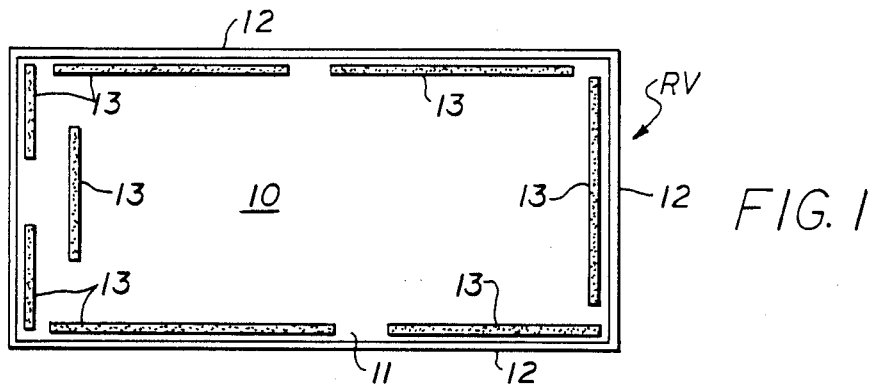
FIG. 1 is a simplified top plan view of a recreational vehicle prior to having the removable floor cover in accordance with the present invention installed therein.

Referring to the drawings by numerals of reference, there is shown somewhat schematically in FIG. 1, a representation of an area 10 of a recreational vehicle RV such as a camper or motor-home. For example, the area 10 to be covered, may be the central area for small campers, or may be various room areas in larger motor-homes, such as the living area, kitchen, bathroom, etc. The area 10 to be covered would have a floor 11 and a wall 12. The floor 11 may also have an existing covering such as carpet or linoleum.

Figures 2, 4:
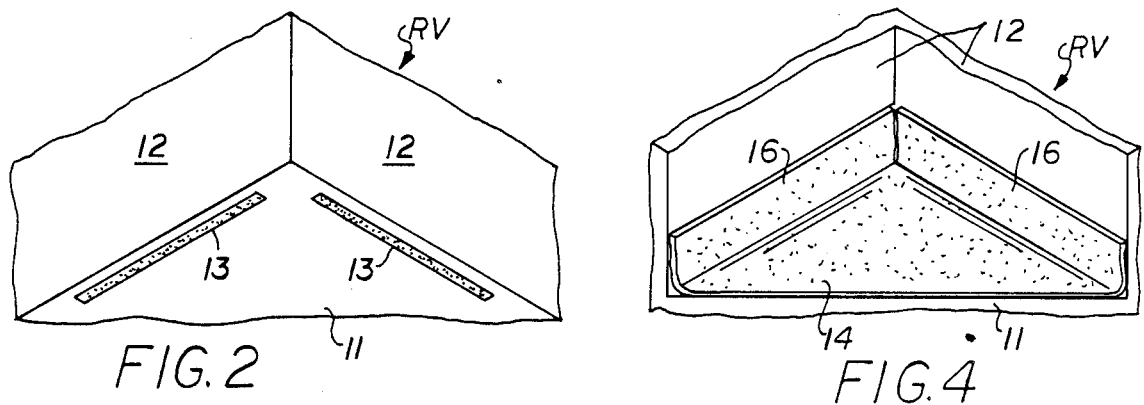
FIG. 2 is a partial isometric view of a corner area of a recreational vehicle prior to having the removable floor cover installed therein.
FIG. 4 is a partial isometric view of a corner area of a recreational vehicle after having the removable floor cover installed therein.

In areas having a hard or slick floor surface, strips of one of the elements of a fabric type, hook and loop, fastener 13, such as Velcro (TM Velcro U.S.A., Inc.) is secured on the floor surface inwardly and closely adjacent the wall (FIG. 2). The fastener strips 13 are secured to the floor 11 in spaced relation by means well known in the art. Depending upon the size of the area being covered, fastener strips 13 may be positioned on the floor 11 only near the walls 12 or in larger areas may be secured at various spaced locations on the floor surface. In areas having existing carpet with fibers of sufficient height there is no need to install the fastener strips 13, since the carpet fiber will serve as a mating fastener element.

Figures 3, 5:
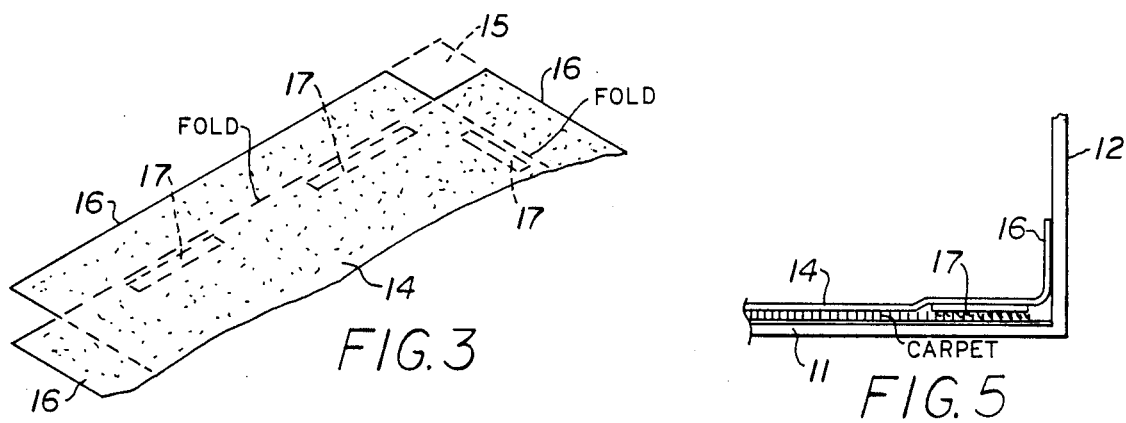
FIG. 3 is a partial isometric view of a portion of the removable floor cover in accordance with the present invention.
FIG. 5 is a cross section of the intersection of a carpeted floor with a wall of the recreational vehicle which has the removable floor cover installed.

As seen in FIG. 3, the removable floor cover 14 is formed of one or more sections of a suitable durable fabric material which is easily washed or cleaned and attractive in appearance, such as canvas, broadcloth, etc., with or without decorative patterns, and may also be treated to be water resistant. The corners 15 of the floor cover 14 are cut out in a square whereby the peripheral edges 16 of the cover may be folded upward at approximately 90°. The edges 16 are preferably from 2" to 4" wide.

Strips of the mating element of the fabric type, hook and loop, fastener 17, such as Velcro (TM Velcro U.S.A., Inc.) are secured onto the underside of the floor cover 14 in spaced relation by means well known in the art. The strips 17 are positioned in spaced relation inwardly from, and parallel to, the edges 16 of the cover 14. Depending upon the size of the area being covered, fastener strips 17 may be positioned on the underside of the cover 14 only inwardly of the outer edges of the cover, or in larger areas additional strips 17 may be secured at various spaced locations on the underside of the cover.

The location of the fastener strips 17 on the cover 14 should correspond to the location of the fastener strips 13 on the floor 11, except in areas having existing carpet with fibers of sufficient height wherein no corresponding fastener strips 13 are needed on the floor and the fastener strips 16 on the underside of the cover are secured at selected locations on the underside of the cover, since the carpet fiber will serve as the mating fastener element (FIG. 5).

Figures 6, 7:
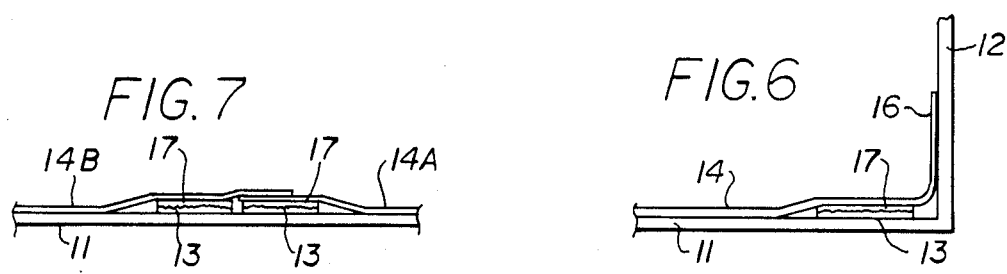
FIG. 6 is a cross section of the intersection of an un-carpeted floor with a wall of the recreational vehicle which has the removable floor cover installed.
FIG. 7 is a cross section of two sections of the removable floor cover installed in an overlapping relation.

As previously noted, the floor cover 14 is formed of one or more sections. In some installations, a single section of floor cover material may be sufficient to cover the floor area. In larger, irregular, or more difficult areas, the floor cover 14 may be installed in several sections 14A and 14B (FIG. 7). In such cases, the sections would be overlapped, and have straight edges along the overlapped areas. Preferably, a number of the fastener strips 13 and 17 would be secured to the floor cover 14 near the straight edges which are to be overlapped and at corresponding locations on the floor to maintain a fairly tight overlapped condition and reduce the chances of tripping.

The floor cover 14 may be produced in prefabricated form by a recreational vehicle supplier wherein the sections are precut to the sizes of the areas of the vehicle and the fabric fasteners 17 are installed thereon with the mating floor fastener strips 13 provided for the installer to secure to the floor. The floor cover 14 may also be sold as a do-it-yourself kit wherein sections of various length are sold with the fasteners wherein the installer would cut the sections to fit the areas to be covered and apply the fasteners 17 to the cover 14 and the fasteners 13 to the floor to fit the particular application.

After the floor fastener strips 13 and corresponding cover fastener strips 17 have been installed, the floor cover 14 is rolled up from two sides toward the center and placed in the center of the area to be covered. The cover 14 is then unrolled from the center toward the sides making sure that the fasteners 13 and 17 are properly positioned and engaged. At the side edges 16, there will be approximately 2" to 4" of cover material remaining which is folded upward along the wall at the baseboard level (FIGS. 4, 5, and 6). Care should be taken that the fasteners 13 and 17 adjacent the wall are engaged.

Preferably, the loop elements of the fastener strips 13 are used on the floor surface, and the hook elements of the fastener strips 17 are used on the underside of the cover 14. In this manner, the existing floor or carpet of the recreational vehicle is protected by the removable floor cover 14. The floor cover will protect the underlying floor or carpet from damage caused by tracking in mud, dirt, debris, and other materials and the exposure to moisture, etc., while the occupants use the vehicle in outdoor areas.

Upon returning to home base or to a convenient location, the cover 14 is easily removed by rolling the floor cover 14 up from two sides toward the center and then lifting the cover from the floor. The cover 14 can then be shaken, vacuumed, or washed, and is ready to be installed again when needed.

While this invention has been described fully and completely with special emphasis upon a preferred embodiment, it should be understood that within the scope of the appended claims the invention may be practiced otherwise than as specifically described herein.

We claim:

1. A removable floor cover assembly for installation over the existing carpeted areas of an automotive recreational vehicle to protect the existing carpet from dirt and wear comprising:
   a removable floor cover formed of one or more sections of a durable washable fabric material of a size and shape for covering the entire carpeted area of said vehicle,
   a plurality of strips of first elements of a fabric hook and loop fastener secured onto the underside of said floor cover in spaced relation positioned inwardly from and parallel to the peripheral edges of the cover,
   said strips spaced inwardly from said cover peripheral edges a sufficient distance to allow the peripheral portion outward of said strips of fasteners to be folded upwardly at approximately 90° to reside against one or more walls of the area being covered, and
   a plurality of strips of second elements of a fabric hook and loop fastener for securing to the carpeted areas of said recreational vehicle at selected locations to cooperate with said first named strips to secure said removable floor cover in place.

2. A removable floor cover assembly according to claim 1 in which
   said floor cover fabric material is treated to be water resistant.

3. A removable floor cover assembly according to claim 1 in which
   said floor cover section is a generally square or rectangular shape and the corners of adjacent edges thereof are cut out in a square whereby the peripheral portion outward of said strips of fasteners may be folded upward at approximately 90° to reside against one or more adjacent walls of the area being covered.

4. A removable floor cover assembly according to claim 1 in which
   said removable floor cover is formed of at least two sections of a durable washable fabric material,
   each section having at least one edge configured to overlap a corresponding edge of another said section, and
   a plurality of additional strips of said first elements of a fabric hook and loop fastener secured onto the underside of said floor cover in spaced relation positioned inwardly from and parallel to edges which are to be overlapped to maintain a fairly tight overlapped condition and reduce the chances of tripping over the overlapped edges.

5. The combination with an automotive recreational vehicle of a removable floor cover installed over existing carpeted areas thereof of a size and shape for covering the entire carpeted area of said vehicle to protect said carpet from dirt and wear,
   said floor covering comprising
   one or more sections of a durable washable fabric material,
   a plurality of strips of first elements of a fabric hook and loop fastener secured onto the underside of said floor cover in spaced relation positioned inwardly from and parallel to the peripheral edges of the cover, and
   said strips spaced inwardly from said cover peripheral edges a sufficient distance to be fastened to the carpet and allow the peripheral portion outward of said strips of fasteners to be folded upward at approximately 90° to reside against one or more walls of the area being covered.

6. A recreational vehicle removable floor cover combination according to claim 5 in which
   the area being covered is carpeted with a carpet having a weave cooperable with the hook elements of a fabric hook and loop fastener, and
   said first elements of said fabric hook and loop fastener are the hook elements, whereby
   the hook elements will become releasably engaged with selected portions of the fibers of the existing carpet when said cover is pressed thereon to maintain said cover on said carpeted area.

7. A recreational vehicle removable floor covering combination according to claim 5 wherein;
   a plurality of strips of second elements of a fabric hook and loop fastener secured onto the floor surface inwardly and closely adjacent to at least one wall of the floor area to be to be covered, and
   said strips of said second elements are positioned to correspond with said strips of said first elements at the peripheral edges of said floor cover,
   said strips of said first element of said fabric hook and loop fastener are the hook elements and said strips of said second element are the loop elements, whereby
   the hooks of said first elements will become releasably engaged with the loops of said second elements when said cover is pressed thereon to maintain said cover on the floor surface.

8. A method of protecting the existing carpeted areas of recreational vehicles from dirt and wear comprising the steps of;
   providing a removable floor cover formed of one or more sections of a durable washable fabric material,
   securing a plurality of strips of the hook elements of a fabric hook and loop fastener onto the underside of said floor cover in spaced relation positioned inwardly from and parallel to the peripheral edges of the cover a sufficient distance to allow the peripheral portion outward of said strips of fasteners to be folded upward at approximately 90° to reside against one or more walls of the area being covered,
   rolling up the floor cover from two sides toward the its center and placing the floor cover in the center of the area to be covered,
   unrolling the rolled up floor cover outwardly until at least one peripheral edge reaches one at least one wall of the area being covered and folding the peripheral edge of the cover upwardly against the wall, and
   pressing downward firmly on the cover to releasably engage the hook elements adjacent the peripheral edge of the cover with the fibers of the existing carpet to maintain said cover on said carpeted area and the peripheral portion of the cover edge outward of said strips in the upwardly folded condition against the wall of the area being covered.

9. The method according to claim 8 including the additional steps of;
   lifting the upwardly folded peripheral portion of the floor cover edge outward and upward from the wall to disengage the hook elements adjacent the peripheral edge of the cover from the carpet fibers, rolling up the floor cover from two sides toward the its center, and removing the rolled floor cover from the recreational vehicle whereby it can be unrolled and shaken, vacuumed, or washed.

10. The method according to claim 8 including the additional steps of;

prior to rolling said floor cover, securing additional strips of said hook elements of the fabric hook and loop fastener onto the underside of said floor cover at various spaced locations on the underside of said cover, and when unrolling said floor cover, pressing downward firmly on the cover to releasably engage the hook elements, whereby the hook elements will become releasably engaged with the fibers of the existing carpet at various locations across the carpet surface when said cover is pressed thereon to maintain said cover on the carpeted area.

11. The method according to claim 10 including the additional steps of:

lifting the upwardly folded peripheral portion the floor cover edge outward and upward from the wall to disengage the hook elements adjacent the peripheral edge of the cover from the carpet fibers, rolling up the floor cover from two sides toward the its center and disengaging the hook elements at various spaced locations from the carpet fibers, and removing the rolled floor cover from the recreational vehicle whereby it can be unrolled and shaken, vacuumed, or washed.

12. A method of protecting the existing floor areas of recreational vehicles from dirt and wear comprising the steps of;

providing a removable floor cover formed of one or more sections of a durable washable fabric material, securing a plurality of strips of hook elements of a fabric hook and loop fastener onto the underside of said floor cover in spaced relation positioned inwardly from and parallel to the peripheral edges of the cover a sufficient distance to allow the peripheral portion outward said strips of fasteners to be folded upward at approximately 90° to reside against one or more walls of the area being covered, securing a plurality of strips of loop elements of a fabric type hook and loop fastener onto the floor surface inwardly and closely adjacent to at least one wall of the floor area to be to be covered and positioned to correspond with the strips of hook elements at the peripheral edges of said floor cover, rolling up the floor cover from two sides toward the its center and placing the floor cover in the center of the area to be covered, unrolling the rolled up floor cover outwardly until at least one peripheral edge reaches one at least one wall of the area being covered and folding the peripheral edge of the cover upwardly against the wall, and pressing downward firmly on the cover to releasably engage the hook elements adjacent the peripheral edge of the cover with the loop elements secured to the floor to maintain said cover on the floor and the peripheral portion of the cover edge outward of said strips in the upwardly folded condition against the wall of the area being covered.

13. The method according to claim 12 including the additional steps of;

lifting the upwardly folded peripheral portion of the floor cover edge outward and upward from the wall to disengage the hook elements adjacent the peripheral edge of the cover from the carpet fibers, rolling up the floor cover from two sides toward the its center, and removing the rolled floor cover from the recreational vehicle whereby it can be unrolled and shaken, vacuumed, or washed.

14. The method according to claim 13 including the additional steps of;

prior to rolling up the floor cover, securing additional strips of the loop elements of the fabric type hook and loop fastener onto the floor surface at various spaced locations, and securing additional strips of the hook elements of the fabric hook and loop fastener secured onto the underside of said floor cover at spaced locations on the underside of said cover corresponding to the location of said additional strips of said loop elements, and when unrolling said floor cover, pressing downward firmly on the floor cover to releasably engage the hook elements of the additional strips on said floor cover with the loop elements of the additional strips on the floor surface, whereby the hook elements will become releasably engaged with the loop elements at various locations across the floor surface when said cover is pressed thereon to maintain said cover on the floor surface.

15. The method according to claim 14 including the additional steps of;

lifting the upwardly folded peripheral portion of the floor cover edge outward and upward from the wall to disengage the hook elements adjacent the peripheral edge of the cover from the loop elements on the floor surface adjacent the wall, rolling up the floor cover from two sides toward the its center and disengaging the hook elements at various spaced locations from the corresponding loop elements on the floor surface, and removing the rolled floor cover from the recreational vehicle whereby it can be unrolled and shaken, vacuumed, or washed.

* * * * *